No. 809,378. PATENTED JAN. 9, 1906.
W. W. KAY.
FARE REGISTER.
APPLICATION FILED APR. 17, 1905.
10 SHEETS—SHEET 1.
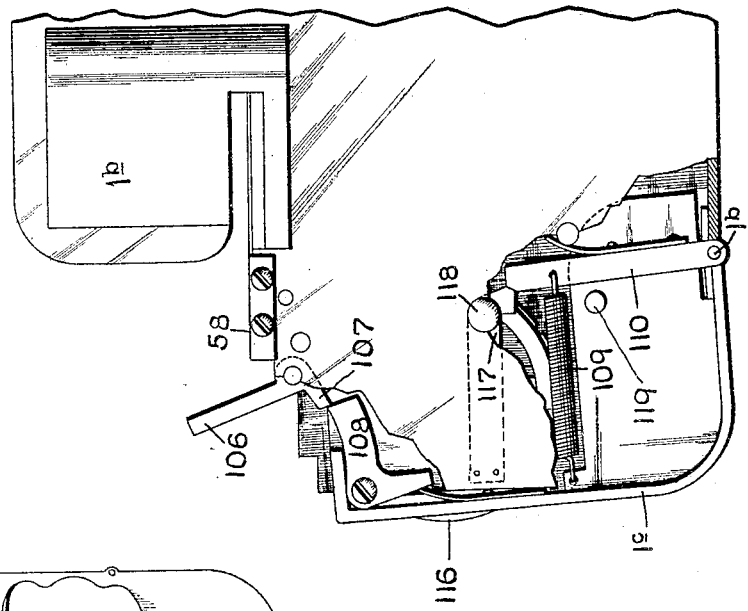
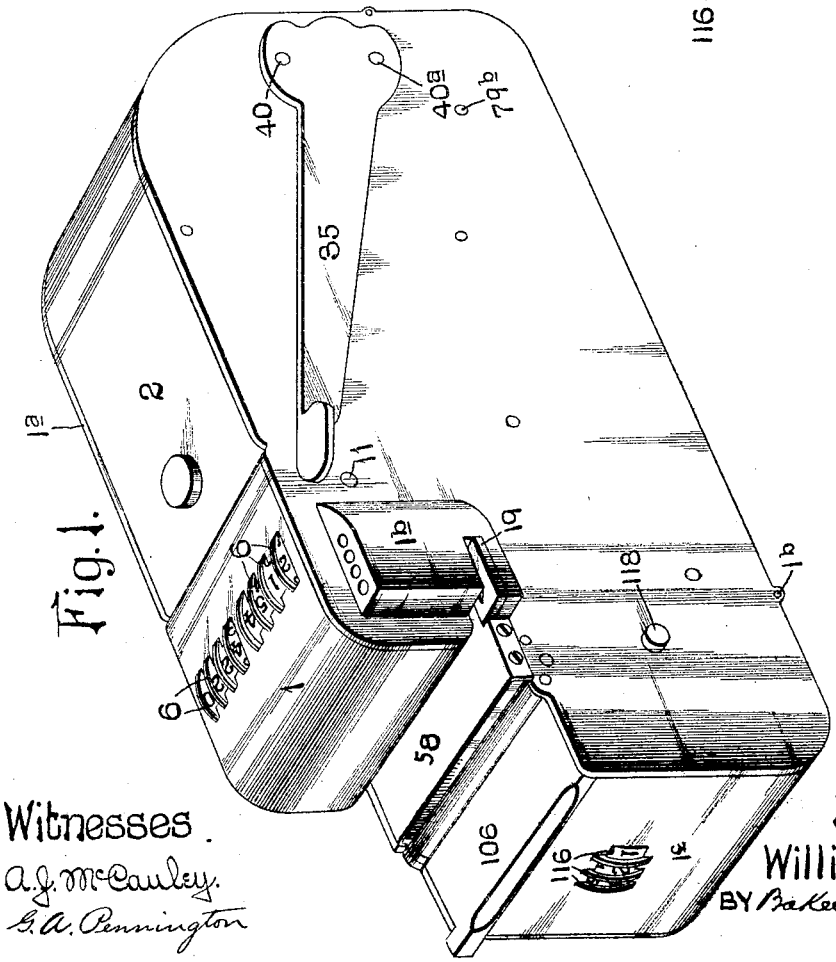
Witnesses
A. J. McCauley.
G. A. Pennington.
Inventor:
William W. Kay
BY Bakewell Kornwall
ATTY'S.

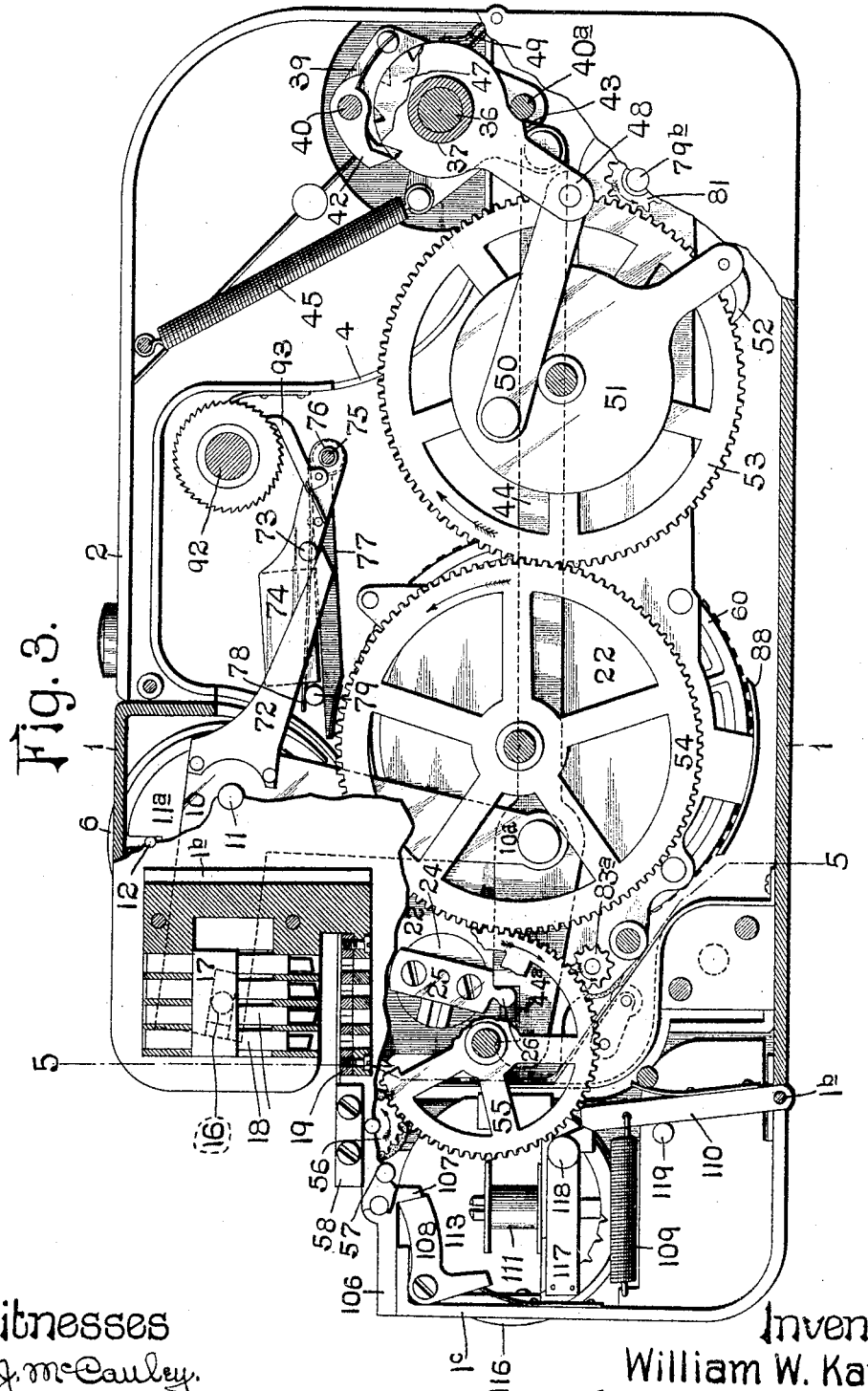

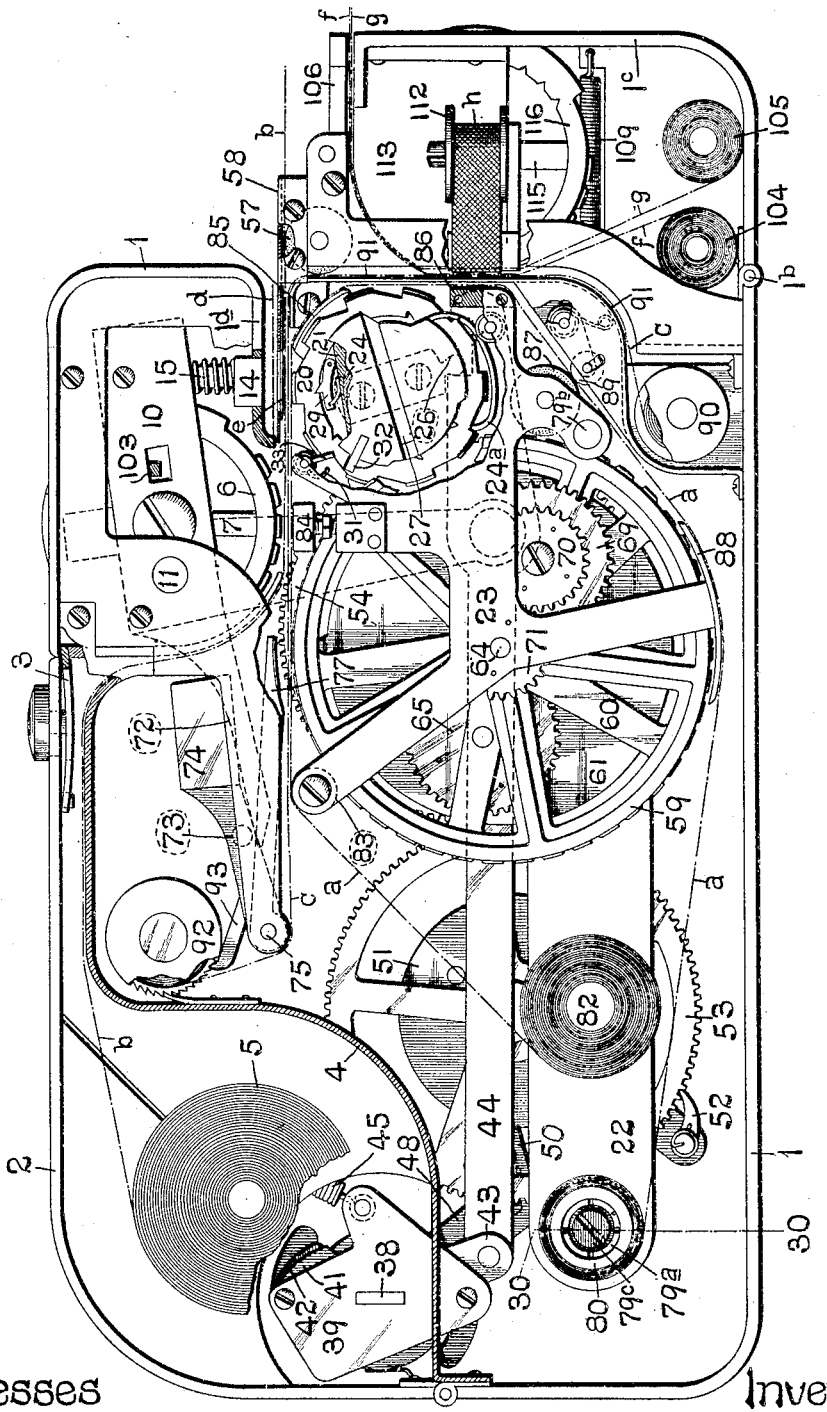

No. 809,378.  
PATENTED JAN. 9, 1906.  
W. W. KAY.  
FARE REGISTER.  
APPLICATION FILED APR. 17, 1905.  
10 SHEETS—SHEET 4.
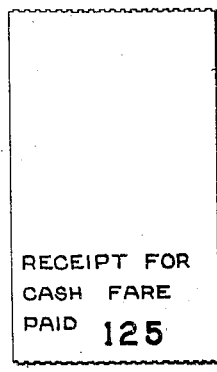
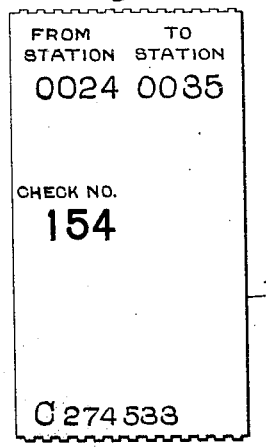
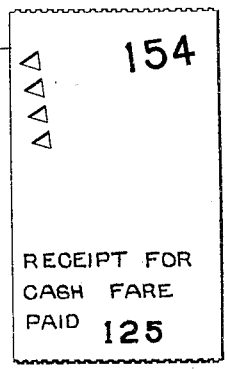
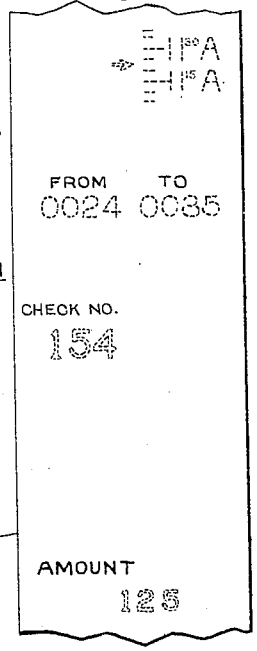
Witnesses  
A. J. McCauley  
G. A. Pennington
Inventor:—  
William W. Kay.  
BY Bakewell Cornwall  
ATTYS.

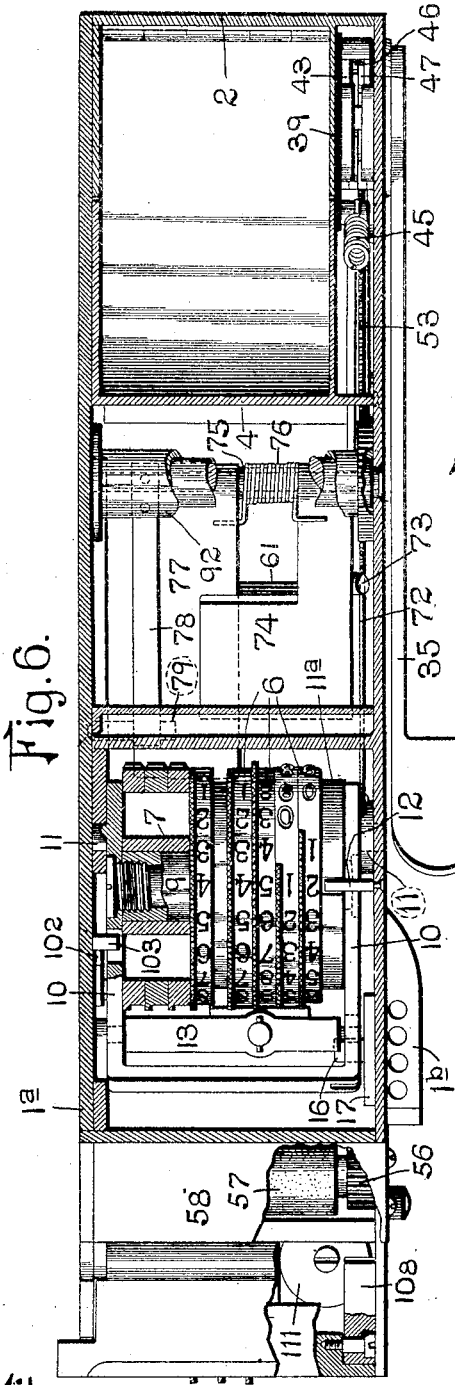

No. 809,378. PATENTED JAN. 9, 1906.
W. W. KAY.
FARE REGISTER.
APPLICATION FILED APR. 17, 1905.
10 SHEETS—SHEET 6.
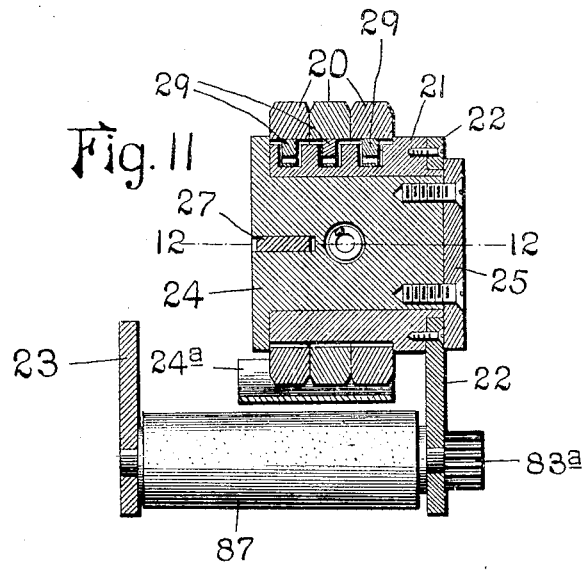
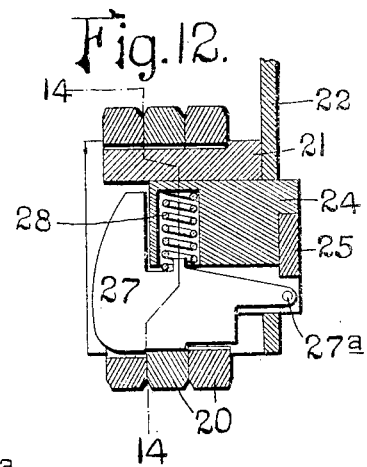
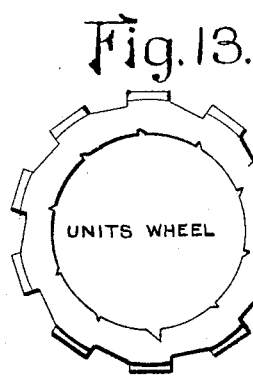
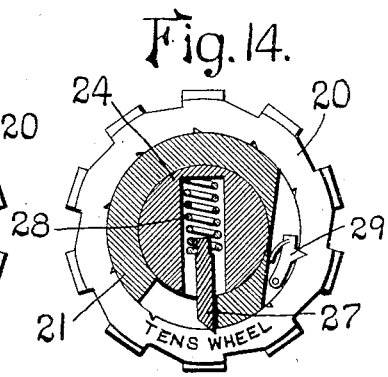
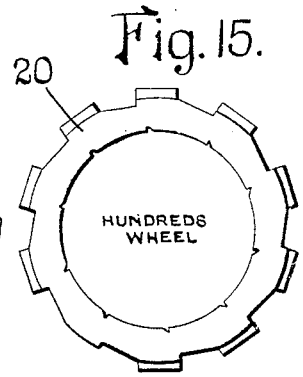
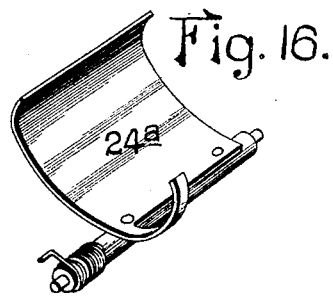
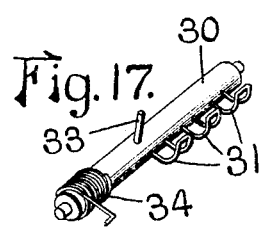
Witnesses
A. J. McCauley
G. A. Pennington
Inventor:—
William W. Kay
BY Bakewell Cornwall
ATTYS.

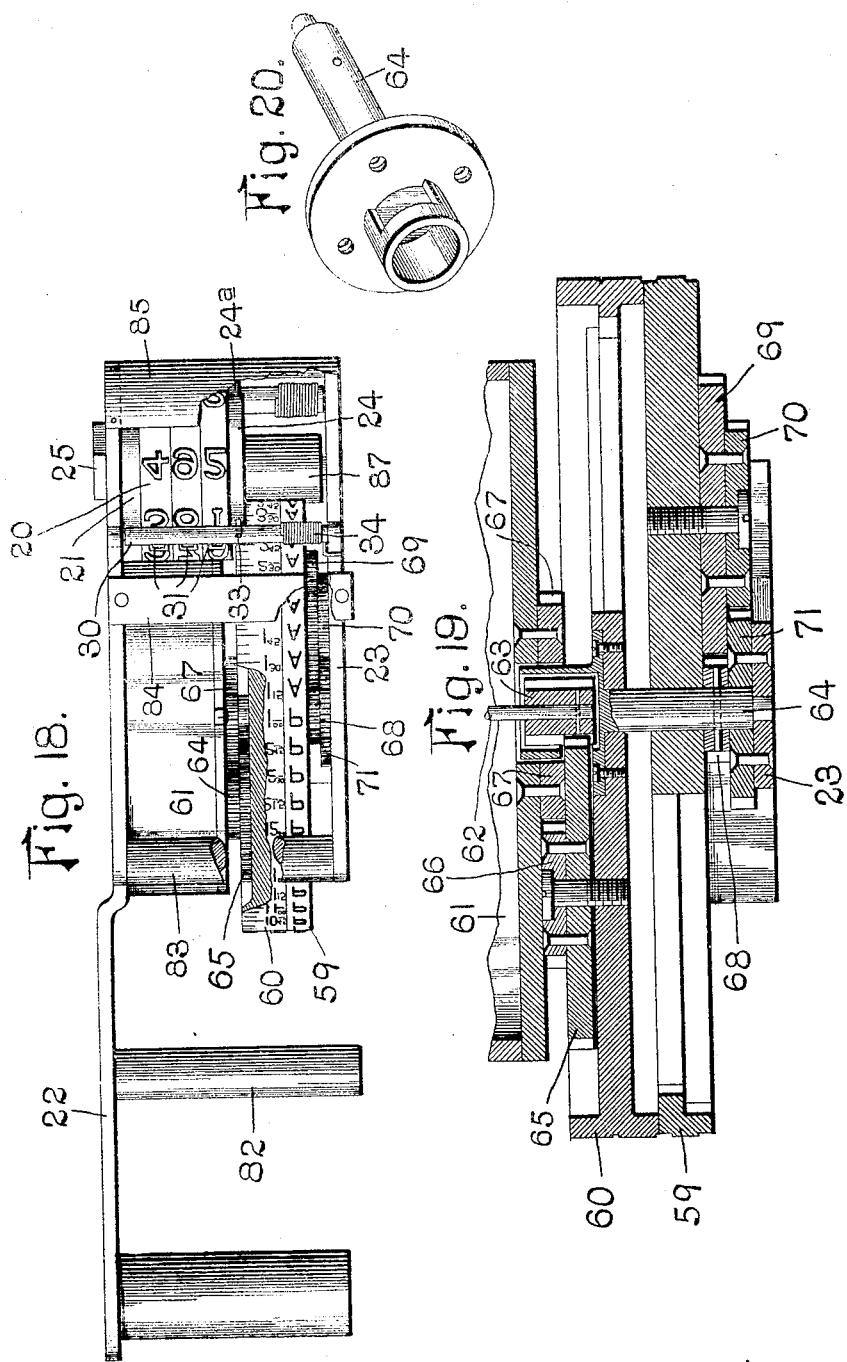

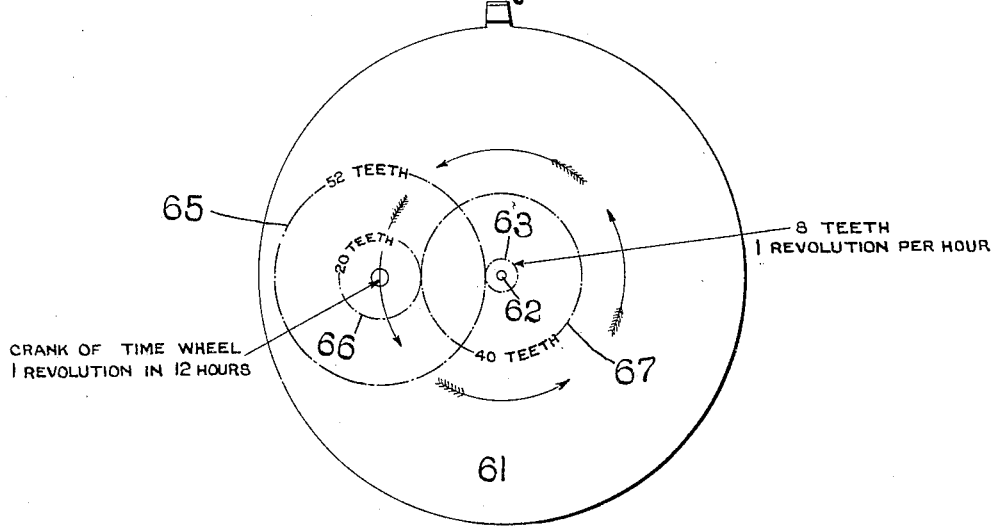
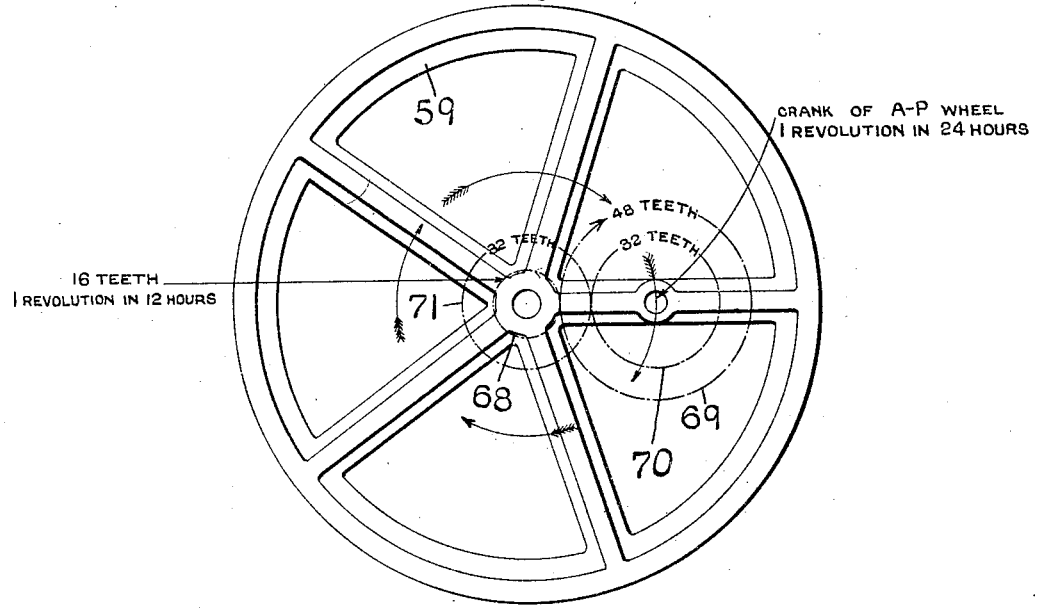

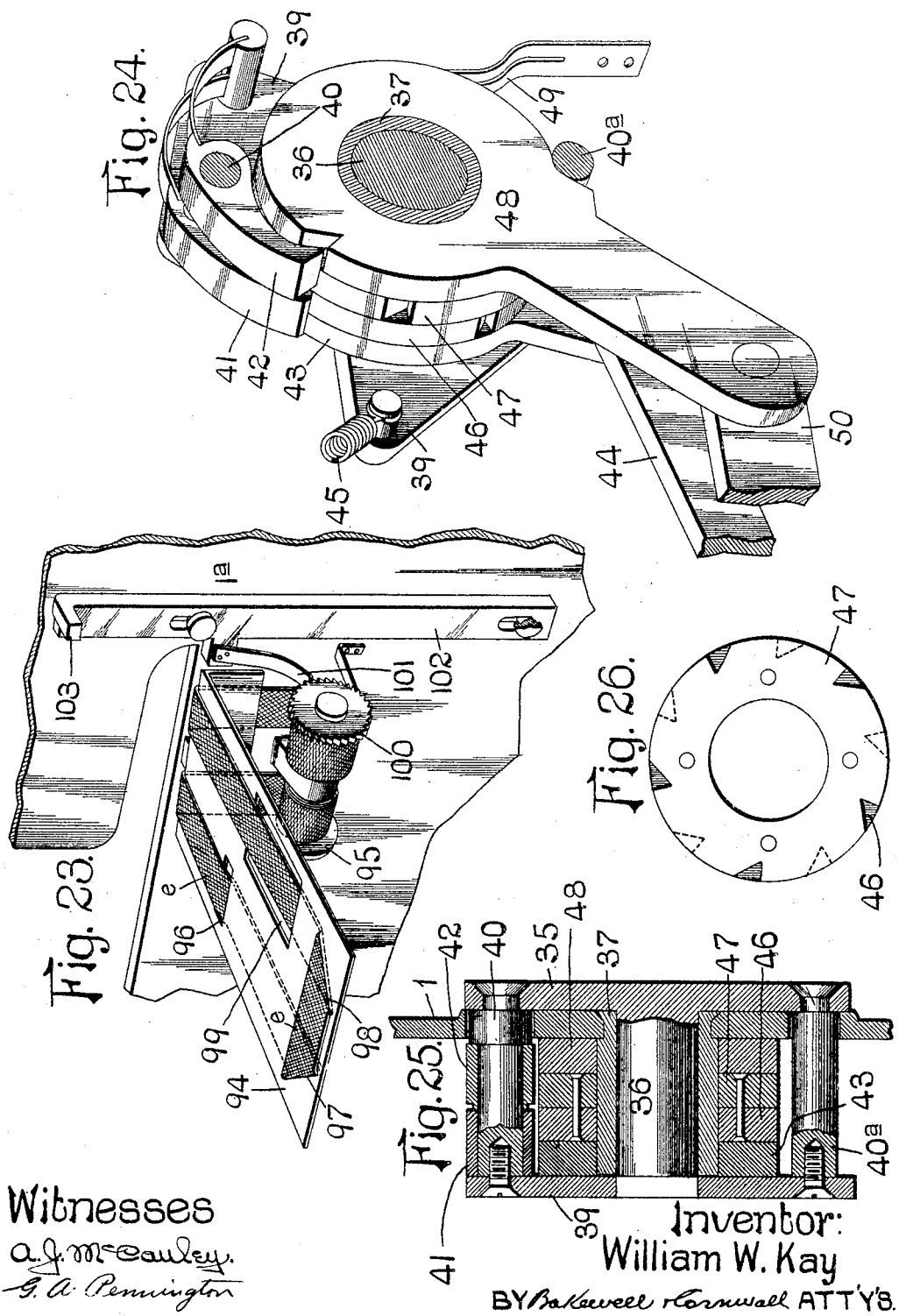

No. 809,378. PATENTED JAN. 9, 1906.
W. W. KAY.
FARE REGISTER.
APPLICATION FILED APR. 17, 1905.
10 SHEETS—SHEET 10.
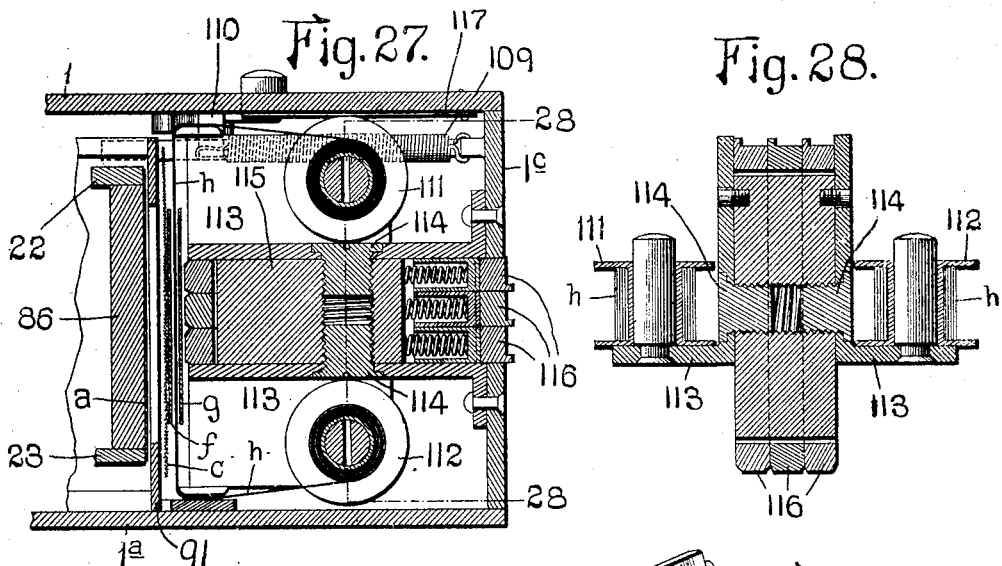
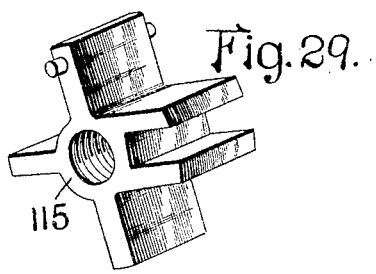
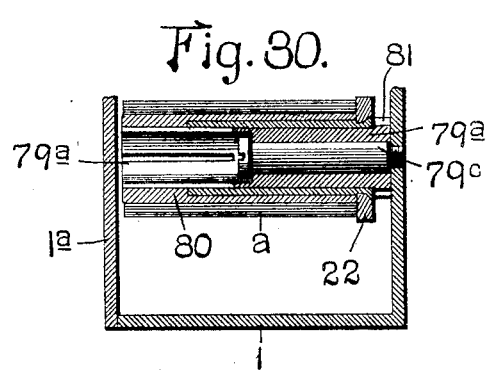
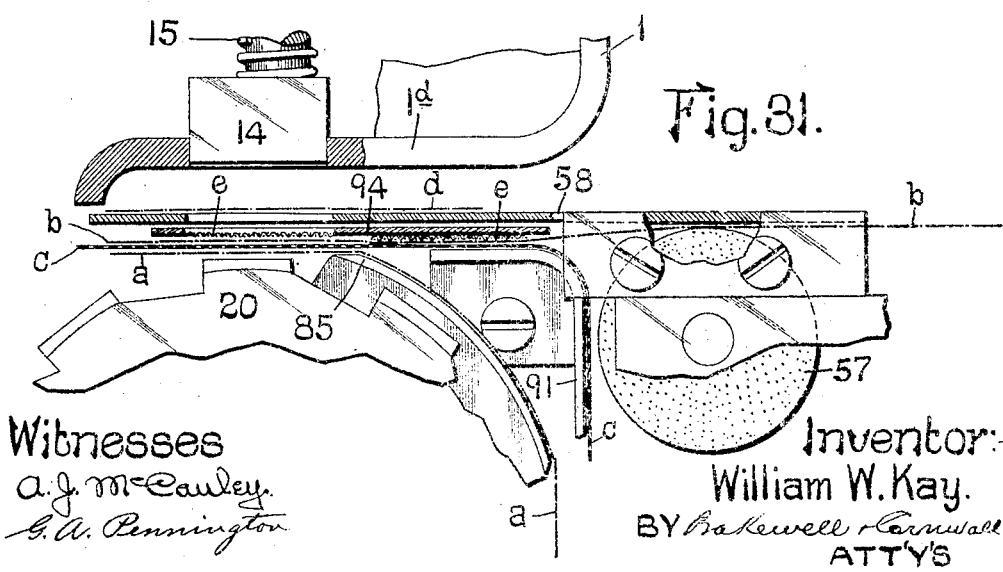
Witnesses
A. J. McCauley
G. A. Pennington
Inventor:—
William W. Kay
BY Bakewell & Cornwall
ATT'YS

UNITED STATES PATENT OFFICE.

WILLIAM W. KAY, OF ST. LOUIS, MISSOURI.

FARE-REGISTER.

No. 809,378.　　　Specification of Letters Patent.　　　Patented Jan. 9, 1906.

Application filed April 17, 1905. Serial No. 256,099.

*To all whom it may concern:*

Be it known that I, WILLIAM W. KAY, a citizen of the United States, residing at St. Louis, Missouri, have invented a certain new and useful Improvement in Fare-Registers, of which the following is a full, clear, and exact description, such as will enable others skilled in the art to which it appertains to make and use the same, reference being had to the accompanying drawings, forming part of this specification, in which—

Figure 1 is a perspective view of my improved conductor's fare-register. Fig. 2 is a side elevational view of the front part of the machine, part of the back casing being removed to more clearly show the interior. Fig. 3 is a side elevational view, partly in section, with the back wall of the casing removed. Fig. 4 is a side elevational view from the opposite side, partly in section, the near side wall being removed to more clearly show the interior. Fig. 5 is a sectional view on the line 5 5 of Fig. 3. Fig. 6 is a horizontal sectional view. Fig. 7 is a detail view of the station-number-printing wheels and the rocking frame in which the same are mounted. Fig. 8 is a sectional view on the line 8 8 of Fig. 7. Fig. 9 is a detail view of the guiding device for the station-number-printing wheels. Fig. 10 is a detail view of the support for the station-number-printing wheels. Fig. 11 is a sectional view through the register-printing wheels. Fig. 12 is a sectional view on the line 12 12 of Fig. 11. Fig. 13 is a detail view of the units-register wheel. Fig. 14 is a sectional view on the line 14 14 of Fig. 12, showing the tens-wheel. Fig. 15 is a detail view of the hundreds-printing wheel. Fig. 16 is a detail view of the overthrow-preventer. Fig. 17 is a detail view of the alining device for the register-printing wheels. Fig. 18 is a top plan view of the time-printing mechanism. Fig. 19 is a horizontal section through the gearing between the time-train and the printing-wheels of the time-printing mechanism. Fig. 20 is a detail view of the arbor on which the printing-wheels of the time mechanism are mounted. Fig. 21 is a diagrammatic view of the gearing between the time-train and the hour-printing wheel. Fig. 22 is a diagrammatic view of the gearing between the hour-printing wheel and the A and P printing wheel. Fig. 23 is a detail view of the removable side wall of the casing, showing one of the inking-ribbons mounted thereon. Fig. 24 is a detail view of the double-faced ratchet and its coöperating pawl identified with the operating-handle. Fig. 25 is a sectional view of the parts shown in Fig. 24. Fig. 26 is a detail view of the double-faced ratchet. Fig. 27 is a horizontal sectional view through the cash-fare-printing wheels. Fig. 28 is a sectional view on the line 28 28 of Fig. 27. Fig. 29 is a detail view of the hub on which the cash-fare-printing wheels are mounted. Fig. 30 is a sectional view on the line 30 30 of Fig. 4. Fig. 31 is an enlarged detail sectional view taken vertically through the mouth of the machine. Fig. 32 illustrates one of the cash-fare receipts issued by the machine. Fig. 33 illustrates a duplicate cash-fare receipt which has been canceled and the register-number stamped thereon. Fig. 34 illustrates a hat-check issued in connection with a ticket or cash-fare receipt canceled by the machine, and Fig. 35 illustrates a portion of the permanent record-strip retained in the machine and identified with the issuance of the cash-fare receipts and hat-check illustrated in Figs. 32 to 34, inclusive.

This invention relates to a new and useful improvement in fare-registers designed especially for use by conductors of railway-trains and particularly where the mileage travel forms the basis of transportation rates.

It is the object of my present invention to construct a fare-register to be used by the conductor in punching tickets which are lifted and also in issuing cash-fare receipts and hat-checks for the tickets or for the cash-fare receipts.

To briefly outline the use of my improved fare-register, we will assume that a passenger surrenders a ticket to the conductor, who proceeds as follows: Certain printing-wheels are adjusted to indicate the point of destination and the ticket is placed in the mouth of the machine and the handle operated to cancel the ticket and print thereon the register-number but not the number of the station of destination. The register-number, the number of the station of destination, and the time that the ticket was lifted are recorded on a permanent record-strip. The first operation of the handle will effect the printing and the second operation of the handle will issue the hat-check and also wind the record-strip. Where a cash fare is paid, printing-wheels are adjusted to set the proper characters in the printing-line, and duplicate cash-fare tickets are severed from the strips by the conductor after the printing impression is made, one of said duplicates being given to the passenger and the other being retained by the conductor as a ticket. The printing of the amount upon the cash-fare receipts also makes an impression on the record-strip before referred to. The receipt retained by the conductor is treated as a ticket, punched with the number of the station of destination and also, in the instance of cash-fare receipts, with the number of the station of departure. The treatment of a cash-fare receipt as a ticket necessitates the same operations of the machine which have been before described with relation to a ticket.

With these objects in view the invention consists in the construction, arrangement, and combination of the several parts, all as will be hereinafter described and afterward pointed out in the claims.

*The casing.*—1 indicates the casing, which is provided with a hinged portion 2, having a slidable bolt 3 for securing said hinged portion in its closed position. This bolt 3 is provided with a suitable button extending on top of the casing, as shown in Fig. 1, by which said bolt may be manipulated. 4 indicates a partition-plate forming a compartment, in which is arranged a roll of blank hat-checks 5. The conductor is provided with a number of these rolls of hat-checks and has access to the compartment at all times, so that he can introduce new rolls when necessary. The hat-checks are fed from the roll over the forward extension of the partition-plate 4 under printing-wheels 6, and thence forward, and above the registering printing-wheels, the outer end of the hat-check being in contact with a feed-roller.

*Station-number-printing devices.*—The printing wheels or rings 6 are formed with printing characters on their lower portions, while their upper portions are provided with corresponding indicating-numbers, as shown in Fig. 5. Each printing-wheel is provided with a slightly-raised knurled edge which projects through an opening in the top of the casing, as shown in Fig. 1. The conductor may adjust these printing wheels or rings 6 manually to any desired position, the number indicated through the opening in the casing having its corresponding character presented in the printing-line on the lower side of the printing-wheel.

7 indicates a spider consisting of a central hub portion with radially-disposed wings, one of said wings, as shown in Fig. 10, being slotted to receive a series of spring-pressed detents 8, which are designed to engage notches in the inner peripheries of the printing-wheels 6. The wheels 6 are mounted upon the spider 7 and are free to be rotated thereon in either direction at the will of the operator, the spring-pressed detents 8 indicating to the operator when a printing character is in printing-line.

9 indicates a post which is held between side frames 10, and which post has the spider 7 mounted thereon and is capable of a slight rocking movement when the printing-wheels are depressed to make their printing impression. The side frames 10 are pivotally mounted on studs 11, so that the printing-wheels swing from such pivotal point. In order to prevent the printing-type from moving on an arc of a circle described about the pivots 11, I arrange a slotted disk 11$^a$ on the end of the spider, (see Figs. 3 and 8,) into whose slot projects a pin 12 from the side wall of the casing. This slot-and-pin connection causes the printing-wheels when moving upon the studs 11 to slightly swing on the post 9, which results in the printing-type being maintained in proper position at the time of making a printing impression. The side frames 10, before referred to, extend forwardly in the form of a yoke, said yoke carrying a rocking bar 13, in which is mounted a platen or impression device 14, the shank thereof passing upwardly through the bar 13 and a spring 15 being interposed between said bar and the head of said platen, whereby during a printing impression said spring is placed under compression, the yielding tendency thereof permitting the yoke to descend a greater distance than necessary to make a printing stroke. This printing-hammer or impression device 14 is guided by an inturned portion 1$^d$ of the casing, which forms a mouth into which the tickets to be canceled are placed.

*Ticket-cancellation devices.*—One of the side frames 10 is provided with an opening into which projects a lug 16 from a block 17. The block 17 is mounted in a vertical guideway in a housing 1$^b$ (see Fig. 1) and carries punches 18, whose cutting ends coöperate with correspondingly-shaped openings in a steel plate 19, mounted on the casing 1, and at the side of the mouth of the device. Whenever the printing-wheels 6 are operated to make a printing impression, the cancellation-punches 18 are also operated, as well as the impression device 14.

*Registering-wheels.*—Located under the impression device 14 is a series of registering wheels or rings 20, whose construction is best shown in Figs. 11 to 15. These wheels 20 are in the form of rings having type characters on their peripheries, said rings being mounted upon a sleeve 21, secured to a removable side frame-plate 22, whose companion removable side frame-plate 23 forms a bearing for other parts of the mechanism capable of being removed from the machine by an authorized officer of the company. Within the sleeve 21 is a rocking block 24, having a flange at one end extending outwardly beyond the sleeve, so as to hold the printing-rings in position, the opposite end of said block having an operating-plate 25 secured thereto, which plate is provided with a striking member 26. (See Fig. 3.) Block 24 is slotted so as to house in a pawl 27, pressed outwardly by a spring 28. This pawl is provided with a stepped operating-face, the steps of which are opposite the units, tens, and hundreds type-rings, respectively. Pawl 27 is preferably pivoted to the block 24 at $27^a$. Each of the type-rings 20 is provided with ten notches in its inner periphery, with which the stepped knife-edge of the pawl 27 is designed to coöperate.

The units-ring (shown in Fig. 13) has one of its notches deeper than the others, so that when the pawl 27 occupies this deep notch it will not only drive the units-wheel one-tenth of a revolution, but will also engage and drive the tens-wheel one-tenth of a revolution. Pawl 27 is in engagement with the deep notch of the units-ring when the printing character "9" is in the printing-line. The next rocking movement of the block 24 will operate the units-ring, so as to present the zero-printing character in the printing-line, and also move the tens-printing ring one-tenth of a revolution, so as to present a printing character of higher denomination in the printing-line.

By referring to Fig. 14 it will be seen that the tens-printing ring is also provided with a deep notch whose function is the same as that of the deep notch in the units-printing ring, to wit: When the pawl 27 lies in the deep notches of the units and tens printing rings the hundreds-printing ring will be operated one-tenth of a revolution. The relation of the notches in the three rings to the pawl 27 is as follows:

The shallow notches of all the printing-rings may be of the same depth. The deep notch of the units-printing ring is three times as deep as any shallow notch. The deep notch in the tens-printing ring is twice as deep as any shallow notch. The stepped operating-face of pawl 27 is so disposed with relation to the printing-rings that the highest step will engage only the units-printing ring and operate the same one-tenth of a revolution at each rocking movement of block 24 until the deep notch is engaged by the pawl, when the second step is thrown into engagement with a shallow notch of the tens-printing ring, the tens-wheel being operated one-tenth of a revolution at each complete revolution of the units-printing wheel. This continues until the deep notch of the tens-printing wheel arrives opposite the pawl 27, when the high step of the pawl, as well as the second step thereof, go to the full depth of their respective deep notches, permitting the third or lowest step of the pawl to engage and operate the hundreds-printing wheel one-tenth of a revolution for each complete revolution of the tens-printing wheel and correspondingly for each ten revolutions of the units-printing wheel. This registering mechanism is inaccessible to the conductor, the wheels being set to "1" by hand by an authorized officer of the company and before the machine is turned over to the conductor. While I have shown three registering-wheels having a series capacity of nine hundred and ninety-nine, it is obvious that more registering-wheels could be employed for the purpose of increasing the capacity of the machine if it is found necessary.

The stationary sleeve 21 is provided with spring-pressed detents 29, (see Fig. 11,) which engage the notches of the printing-rings and hold them stationary while the block 24 is recovering. In order to aline the registering-wheels in printing position, I mount a rock-shaft 30 between the side frames 22 and 23 and provide the same with a series of fingers 31 in the form of bent loops of wire. The rocking block 24 is provided with a projection 32 on its head which is designed to engage a pin 33 on the shaft 30 and rock said shaft, moving the fingers 31 in front of the teeth of the printing-rings, so as to properly aline said rings in printing position at the moment the impression occurs. A spring 34 tends to return the shaft 30 to normal position wherein the fingers 31 move to a position so as not to interfere with the movement of the printing-rings.

The block 24 is rocked at each alternate operation of the handle 35, and in order to prevent the overthrow of the registering-wheels I mount an escapement-pawl $24^a$ on a rock-shaft, (see Fig. 16,) which escapement-pawl is in the shape of a blade engaging all of the printing-wheels. A spring is arranged on the rock-shaft and tends to force the blade away from the wheels. The opposite edge of the blade is curved upwardly, so as to engage a cam-face on the flange of the block 24, (see Fig. 4,) whereby when said block is rocked from the position shown the cam-face will permit the escapement-pawl to release all of the wheels and during this release any of the wheels may be operated. When the block is restored to normal position, however, the cam-face on the flange thereof forces the blade of the escapement-pawl in front of the shoulders on the printing-wheels, so as to arrest said printing-wheels and prevent overrotation thereof.

*Operating mechanism.*—Referring to Fig. 1, it will be seen that an operating-handle 35 is arranged on the side of the casing. This handle 35 is provided with a stud 36, which extends through a sleeve 37, fixed in the casing 1. The inner end of this stud is provided with a transverse rib 38, which fits into a correspondingly-shaped opening in a plate 39. (See Fig. 4.) Between this plate 39 and the hub-flange of the operating-handle (see Fig. 25) are secured posts 40 and $40^a$, which posts extend through concentric slots in the casing 1. On post 40 are arranged two pawls 41 and 42, each having appropriate springs tending to force their free ends inwardly into engagement with their coöperating ratchets.

Referring now to Fig. 3, 43 indicates a rock-arm having a single notch in the periphery of its hub with which the pawl 41 is designed to coöperate upon alternate strokes of the operating-handle. This rock-arm 43 is connected to a link 44, (see Fig. 3,) which link at its forward end is pivotally connected to an extension 10ª on the rocking frame 10. (See Figs. 3 and 6.) The forward end of link 44 is recessed at 44ª, so as to provide two shoulders which coöperate with the striker portion 26 of the rocking block 24, there being sufficient lost motion in this recessed portion to permit a relatively long stroke of the link 44 and a movement of the striker projection 26 equivalent to one-tenth of a revolution of the printing-rings 20 of the register. A spring 45 is connected to the plate 39 and tends to hold the operating-handle in an elevated position at all times. The rock-arm 43 is loosely mounted on the sleeve 37. When the parts are in the position shown in Fig. 3, an operation of the handle 35 will cause the pawl 41 in engagement with the notch in the hub of the rock-arm 43 to move the link 44 backwardly and force the printing-wheels 6 to make a printing impression, to force the cancellation-plungers 18 downwardly, to force the impression device 14 downwardly to take an impression from the registering-wheels, and to rock the block 24, so that upon its return movement it will advance the registering-wheels one number.

Referring now to Figs. 24 and 26, it will be seen that there are two ratchet-wheels 46 and 47, each provided with five notches in its periphery and secured together, so that said notches are circumferentially displaced, the notches of each wheel being opposite a blank portion of the other wheel and between the notches of said other wheel, said two ratchet-wheels being loosely mounted upon the sleeve 37. The ratchet-wheels 46 and 47 constitute a double-faced ratchet which is so mounted that the portion 46 is adjacent the rock-arm 43, while the portion 47 is adjacent another rock-arm 48, said rock-arm having a single notch in the periphery of its hub which is designed upon alternate strokes of the handle to coöperate with the pawl 42. In the position of the parts shown in Fig. 3 when the pawls 41 and 42 are driven forwardly the pawl 41, resting in the notch of arm 43 and in one of the notches of the wheel 46, will rock the arm 43 and impart motion to the link 44. During this operation the pawl 42 will be out of engagement with the notch in the arm 48, said pawl 42 resting idly upon the periphery of the ratchet-wheel 47. Thus the arm 44 is moved rearwardly, and when the operating-handle is released the spring 45 will restore the parts to normal position, the post 40ª engaging the arm 43 and moving it forwardly to its normal position. Detaining-springs 49 coöperate with the double-faced ratchet-wheel for preventing the return movement thereof, so that as the post 40 is restored the pawls 41 and 42 are retracted, pawl 41 being elevated by the wheel 46 and the pawl 42 dropping in the notches of wheel 47 and the rock-arm 48. The next operation of handle 35 will cause the pawl 41, which is resting on the periphery of wheel 46, to ride past the notch in arm 43 without operating said arm; but the pawl 42 in engagement with the notch in arm 48 will rock said arm and with it a link 50, connected to a disk 51, mounted on a stud extending from the casing 1. Disk 51 carries a pawl 52, which meshes with a gear 54, said gear in turn meshing with a gear 54, mounted on a stud on the back plate of casing 1. Gear 54 meshes with another gear 55, also mounted on the back casing-plate and driving a pinion 56, conjoined to a paper-feed roller 57, arranged between the side walls of the casing and under the plate 58, which forms the table upon which the ticket to be canceled is placed when it is inserted into the mouth of the machine.

From the above it will be seen that the first operation of the handle 35 when the pawl 41 engages the arm 43 and the ratchet 46 will effect the printing impressions above described, the arm 48 in the meanwhile remaining idle. The next succeeding operation of the handle 35 will operate the paper-feeding mechanism through the gearing just described, during which the arm 43 remains idle. The hat-check which is fed forwardly by the roller 57 is designed not to be issued its full length at a single operation of the handle because the hat-checks, as shown in Fig. 34, are preferably marked with lines of severance and should be properly positioned at each operation, so as to insure the printing impressions being in their proper spaces thereon. Thus when the hat-check is issued the conductor may either grasp it and pull it forwardly the proper distance before severing it or he may by allowing the handle 35 to be lifted a slight distance and again depressing it before it reaches its home position further project the hat-check until the proper position is reached. A partial stroke of the handle 35 when the pawl 42 is in operative position will drive the train of gears and operate the roller 57, as before described. When the handle 35 is returned to home position after issuing the hat-check, the pawl 42 is rendered inoperative and the pawl 41 placed in an operative position ready for the next printing impression.

*Time-printing mechanism.*—Referring to Figs. 18 and 19, it will be seen that there are two printing-wheels mounted between the movable side frames 22 and 23. One of these wheels (marked 59) is provided with a series of printing characters on its periphery, one half being "A's," being an abbreviation for antemeridiem, and the other half being "P's," being an abbreviation for postmeridiem. The other printing-wheel (marked 60) carries printing characters on its periphery indicating hours and quarter-hours. 61 indicates a casing containing a spring-actuated time-train, which is wound before the conductor starts on his trip and which is designed to run a sufficient length of time to cover the work of the particular conductor in charge of the apparatus. This time-train drives a minute-hand shaft 62 one revolution every hour, and from this the wheel 60 is driven one revolution every twelve hours and the wheel 59 one revolution every twenty-four hours. The method of gearing the minute-hand shaft to the wheel 60 is shown more clearly in Fig. 19. Secured on the outer end of the minute-hand shaft 62 is a pinion 63, over which is fitted a barrel, (see Fig. 20,) whose hub portion is cut away to expose the teeth of the pinion 63. The flange of this barrel is secured to the web of the wheel 60, said barrel being extended through said web to form a stud-shaft 64, on which the wheel 59 is loosely mounted. On the web of wheel 60 is mounted a gear 65, meshing with a pinion 63, to which gear 65 is conjoined a pinion 66, meshing with a stationary gear 67, secured to the face of the casing 61 and concentric with the pinion 63. The arrangement of these gears is best shown in the diagrammatical illustration in Fig. 21, in which are marked figures indicating the number of teeth in each of the gears constituting this train. The pinion 63 has eight teeth and makes one revolution each hour. The gear 65 meshing therewith is provided with fifty-two teeth and is journaled on the web of wheel 60. Thus when motion is imparted to gear 65 its conjoined wheel 66 will be forced to describe an orbit about the fixed wheel 67 and carry with it the printing-wheel 60. Twelve revolutions of the pinion 63 will cause the printing-wheel 60 to make one complete revolution. Gear 67 having forty teeth and being fixed, it follows that one revolution of gear 66 (with twenty teeth) will cause the axis of gear 66 to describe one-half an orbit, (the printing-wheel making one-half a revolution.) Gear 65, conjoined to gear 66, also in this half-orbital movement makes one complete revolution. The eight-toothed driving-pinion during the same time (six hours) makes six complete revolutions. Six revolutions of pinion 63 would, if gear 65 were stationarily mounted, move said gear the distance of forty-eight teeth; but as the axis of gear 65 is describing an orbit in a direction opposite the direction of rotation of pinion 63 it follows that gear 65 must have an extra number of teeth to compensate for its advancing orbital movement equal at its half-orbital position to one-half the number of teeth of the driving-pinion (in this instance four) making a total of fifty-two teeth in gear 65. The sun-and-planet gearing employed to drive the printing-wheel 60 from the minute-hand of the clock mechanism is also employed to drive the printing-wheel 59 one revolution in twenty-four hours from the stud-shaft 64, which is conjoined to printing-wheel 60 and rotates one revolution every twelve hours. This sun-and-planet gearing is simply a speed-reducing mechanism and with relation to the printing-wheel 59 comprises a pinion 68, fixed to the shaft 64 and meshing with a gear 69, carried by the web of the printing-wheel 59. Conjoined to gear 69 is a gear 70, which meshes with a stationary gear 71, fixed to the side frame-plate 23. This sun-and-planet gearing is diagrammatically illustrated in Fig. 22, its principle of operation being the same as that described with reference to Fig. 21, except that the ratios between the gears are slightly different, as indicated in the drawings.

The time-printing mechanism above described makes an impression upon the record-strip at each operation of the handle 35, the "A's" printing between midnight and noon and the "P's" printing between noon and midnight. In connection with the hour-printing mechanism the printing-wheel impresses characters indicating quarters of hours; but it is obvious that finer divisions of time could be indicated, if desired. Midday or midnight is indicated by the "A's" or "P's," being above each other on the strip. A plurality of these characters—say three—are printed at each impression for this purpose.

To take an impression from the printing characters on wheels 59 and 60, irrespective of their positions, I utilize the vibrating pivoted frame 10, which carries the station-numbers in the following manner: Referring to Fig. 3, it will be seen that frame 10 carries a yielding tailpiece 72, which coöperates with a lateral projection 73 on a printing-hammer 74. This printing-hammer is pivoted on a rod 75, around which is wound a spring 76, tending to force said hammer downwardly at all times. 77 indicates a swinging platen mounted on rod 75 and which is provided with a leaf-spring 78, coöperating with a rod 79, tending to hold said platen upwardly at all times against said rod and away from the printing-type. As the frame 10 is rocked it lifts the printing-hammer against the spring 76 until the tailpiece 72 rides up, at which time the printing-hammer, being released, will descend and strike the platen, delivering a quick blow upon the platen and overcoming the resistance of spring 78 and forcing the platen against the printing-type of wheels 59 and 60. Spring 78 is strong enough to lift the type-hammer 74 and to instantaneously raise the platen from the type. As the frame 10 is restored to normal position the tailpiece 72 rides past the inclined face of the projection 73, it being laterally displaced in this movement until said tailpiece again occupies its position under said projection 73.

*The record-strip.*—Referring to Fig. 30, it will be observed that the casing 1 has a post $79^c$ secured thereto. On this post is loosely mounted a sleeve $79^a$, the outer end of which is hollow and split so as to form spring-fingers. On this sleeve is a spool 80, which is revolubly mounted in the back of the frame-piece 22. This enables the frames 22 and 23 to be removed from the machine when the side plate $1^a$, which is preferably so mounted that it can be removed, is swung back, and when this frame is inserted in position, with the post and sleeve in the spool 80, said post and sleeve not only form a support for the removable frame and its carried parts, but also provide a frictional drive for the spool. The inner end of sleeve $79^a$ is provided with a pinion 81, with which pinion meshes the gear 53 before described. Thus when the hat-check is issued the split sleeve will be rotated, the movement imparted to the split sleeve being more than is required to wind up the record-strip, so that said record-strip will at all times be kept taut. The record-strip, which is marked $a$ and which is wound on the spool 80, issues from a spool 82, arranged on a spindle projecting from the back plate 22. From spool 82 this record-strip, which I have marked $a$, passes over a rod 83, arranged between the frames 22 and 23, thence between the platen 77 and the wheels 59 and 60, thence between a platen 84 which is adjustably mounted between the frames 22 and 23 and the printing-wheels 6, thence between the printing-rings 20 and the platen 14, then over and around a shoe 85, thence down between a platen 86 and the cash-fare-printing wheels hereinafter described, thence under a driving-roller 87, mounted between frames 22 and 23 and having a pinion $83^a$ in mesh with gear 55, thence under a shoe 88, carried by the frames 22 and 23, and finally to the spool 80. Everything mounted upon the frames 22 and 23 is included within the path of travel of the record-strip and sleeve $79^a$ and is capable of being taken out of the machine by an authorized person having a key to the door or panel $1^a$. This enables such authorized person to set the registering-wheels back to zero and wind the time-train preparatory to delivering the device to the conductor. In addition to sleeve $79^a$ there is a post $79^b$, passing through openings in the frame-plates and serving to hold the same in proper position. In order to hold the record-strip against the roller 87, I mount a spring-pressed roller 89 in swinging arms, and which roller bears against the under side of the record-strip. The record-strip is preferably made of thin paper, so that the type coming in contact therewith will make a well-defined impression therethrough and onto the hat-check strip, which is indicated at $b$, a double-faced carbon-ribbon $c$ traveling between the record-strip and the hat-check. Of course the impression on the record-strip will be a negative one, but by looking at the back of said strip or holding it to the light the figures will be clearly perceptible to the observer. A positive impression is preferably made on the hat-check which is issued to the passenger.

*The inking-ribbon.*—The ribbon $c$ before referred to issues from a spool 90 and passes up alongside of a thin partition-plate 91, which is provided with an opening for the cash-fare-printing wheels to make a printing impression. The record-strip also passes down by the side of this thin partition-strip, but on the opposite side thereof from the inking-ribbon $c$. As shown in Fig. 4, this partition-plate 91 is bent inwardly at its top, the inking-ribbon $c$ going above the record-strip and being parallel to said record-strip up to the bar 83. Behind the said bar 83 the inking-ribbon $c$ passes under the shaft 75 and onto a spool 92, which spool has a ratchet coöperating with a ribbon-feeding pawl 93, mounted upon the type-hammer 74. Thus the spool 92 is actuated at each vibration of the type-hammer 74.

It will be noted that the strip $b$ of the hat-check spool passes above the time-printing wheels, but runs parallel to the record-strip under the printing-wheels 6 and above the printing-rings 20, and in order to have the printing-rings 20 make an impression on the ticket placed in the mouth of the machine it is necessary to arrange an inking-ribbon between the hat-check strip $b$ and the ticket which is indicated at $d$. This I accomplish by arranging an inking-ribbon $e$ in the plate 58, which is provided with an opening for the platen 14, whereby the ticket is pressed through the said opening onto the inking-ribbon, the type making its impression on the under side of the ticket through the record-strip $a$, the inking-ribbon $c$, the hat-check $b$, and the ribbon $e$.

The ribbon $e$ is best illustrated in Fig. 23. This figure illustrates a carrying-plate 94, secured to the removable plate $1^a$, which plate 94 lies directly under the plate 58. Ribbon $e$ issues from a loosely-mounted spool 95 and passes up over the plate 94 and thence down through an opening 96 under said plate and through diagonal openings 97 and 98, whence it traverses an opening 99 in line with the platen 14 and passes down from on top of the plate 94 to the winding-spool 100, which is rotatable independently of the spool 95, having a ratchet coöperating with a pawl 101. This pawl is mounted on a sliding bar 102, which is provided with a projection 103 at its upper end, said projection 103 fitting in an opening in the rocking frame 10, so that whenever said frame is rocked the ribbon $e$ will be advanced. Plate 94 and bar 102 are mounted on the removable side $1^a$ of the casing, so that when said side is removed said parts are carried with it so as to be out of the way of the removable frame-plates 22 and 23 and their associate parts.

*Cash-fare-printing mechanism.*—The front end of the casing 1 is hinged at $1^b$, so that the front portion of the casing $1^a$ is movable. This hinged section $1^c$ carries two spools of paper 104 and 105, from which issue strips $f$ and $g$, said strips passing up between the platen 86 and the printing-wheels, thence over the frame inclosing the cash-fare-printing wheels, and out under a hinged plate 106. This hinged plate at its inner end carries a projection 107, which coöperates with a spring-pressed pawl 108. When this plate is lifted, as shown in Fig. 2, the entire section $1^c$ and its carried printing-wheels is moved outwardly until the part 107 rides past the part 108, when a spring 109, connected to the hinged section $1^c$ and to a bar 110, draws the section inwardly and causes the type on the printing-wheels to make a printing impression. The ribbon $h$, which passes between strips $f$ and $g$, is arranged on spools 111 and 112, said spools being mounted upon suitable spindles on a frame 113, which frame is secured to the hinged section $1^c$. Frame 113 is provided with openings for the passage of screws 114, which are threaded into a spider 115, said spider forming a support for printing-wheels 116. This spider is slotted to receive spring-pressed detents which coöperate with notches in the printing-rings to hold said rings in adjusted positions. These printing-rings extend through the section $1^c$ and are provided with knurled edges, whereby they may be manually rotated to set up different type in the printing-line. The bar 110 at its upper end bears against a yielding plate 117, having a button 118 projecting through the side of the casing, whereby the bar 110 is normally restrained, and when the section $1^c$ is moved outwardly the spring 109 is placed under tension. However, when the button 118 is pushed inwardly, so as to move the stop on the end of plate 117 out of the path of bar 110, the entire section $1^c$ may be fully opened to give access to the interior for the purpose of introducing fresh rolls of paper, &c. There is a bar 119 carried by the hinged section $1^c$, which is mounted in front of the bar 110 to keep the same in proper position when the section $1^c$ is fully opened.

*Issuing a cash-fare receipt.*—Should a passenger pay the conductor a cash fare, the conductor first adjusts the printing-rings 16, located in the pivoted front section of the machine, so as to indicate the amount received by him. The pivoted plate or lip 106 is now raised, so as to make an impression upon the strips $f$ and $g$ and also upon the record-strip $c$. The lip 106 gives access to the strips $f$ and $g$, which are now pulled forward by the conductor the proper distance and severed, the plate 106 being swung back to normal or closed position. One of these receipts—say the one illustrated in Fig. 32—is handed to the passenger and the other is canceled by the conductor and turned in to the company. The conductor in canceling this receipt treats it the same as he would a ticket purchased at the station and lifted on the train, so that in describing the operation of the machine with respect to the cash-fare receipt illustrated in Fig. 33 such description will be understood as being applicable to a ticket or a coupon of a ticket.

The cash-fare receipt illustrated in Fig. 33 (or the ticket, as the case may be) is placed in the mouth of the machine so that one edge thereof lies under the cancellation-punches, and the operating-handle 35 is depressed. This cancels the ticket and also, through the medium of the inking-ribbon $e$, impresses the register-number on the ticket, said register-number being also impressed upon the record-strip $a$ and upon the hat-check $b$. It will be noticed that when the amount of the cash fare received was impressed on the record-strip $a$ said record-strip was not moved, so that the cash fare received and so recorded is identified with the register-number on the record-strip. In addition to this the station of destination, if the ticket is being canceled, or the station of destination and the station of origin, if the cash-fare recept is being canceled, is also impressed upon the hat-check $b$ and the record-strip $a$. The time of such cancellation is also impressed upon the record-strip $a$, so as to constitute a part of the permanent record and indicate to an authorized officer of the company the time when the cash-fare receipt or ticket was canceled and the hat-check issued therefor. This time constitutes a check on the conductor, as records are kept in the offices of the road regarding the time occupied by the train in going from one station to another. In addition the conductor is supposed to "work" his train within a given time after leaving any station. The time of canceling a ticket or cash-fare receipt is therefore of importance to the company, but of no importance to the passenger. The first operation of the handle 35 effects the cancellation of the ticket and the printing operations above described, while the second operation of the handle issues the hat-check which is severed. The hat-check, however, is not delivered to the passenger, but put in a receptacle above the seat of the passenger and locked up, being accessible only to a train inspector. This receptacle, however, forms no part of my present invention.

I do not in this application claim the details of construction of the various parts of the device shown in the accompanying drawings and herein described, as it is obvious that various forms of mechanism could be employed to carry out my invention, and therefore I desire it to be understood that I do not limit myself to the details shown and described except as they may be expressly mentioned in the claims. However, I reserve the right to file a separate application on the said details of construction.

I am aware that changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a conductor's fare-register, the combination with a totalizer, means for registering in said totalizer and recording on a strip of paper the number of tickets or cash-fare receipts canceled by the machine, canceling devices operable in connection with said registering and recording means, time-printing wheels, and means for impressing the time on the record-strip in connection with each ticket or cash-fare receipt registered, recorded and canceled; substantially as described.

2. In a conductor's fare-register, the combination with means for registering and recording the number of tickets or cash-fare receipts lifted, time-printing wheels, means for impressing the time on the record-strip in connection with the registration and recordation of each ticket or cash-fare receipt lifted, station-number-printing wheels, and means for making a printing impression upon said record-strip from said station-number-printing wheels; substantially as described.

3. In a conductor's fare-register, the combination with means for advancing a record-strip, of means for advancing a hat-check strip, station-number-printing wheels, register-printing wheels, time-printing wheels, and means for impressing the station-numbers and register-numbers on said strips, said means impressing the time on the record-strip only; substantially as described.

4. In a conductor's fare-register, the combination with cash-fare-printing wheels, of time-printing wheels, means for advancing a record-strip past said cash-fare-printing wheels and said time-printing wheels, means for impressing the time on the record-strip in connection with each cash-fare item recorded, and independent mechanism for impressing the cash-fare-printing wheels on said record-strip; substantially as described.

5. In a conductor's fare-register, the combination with means for supporting a record-strip, printing mechanism for recording cash fares on said strip, independent printing mechanism for recording the time on said strip, a time-train for driving the type-wheels of said last-mentioned printing mechanism, and independently-operable means for making printing impressions from said wheels on said record-strip; substantially as described.

6. In a conductor's fare-register, the combination with printing mechanism for recording and registering tickets and cash-fare receipts collected by the conductor, means for feeding a record-strip, a clock mechanism, printing-wheels driven by said clock mechanism, and means whereby said clock-driven printing-wheels are caused to make a printing impression; substantially as described.

7. In a conductor's fare-register, the combination with printing mechanism for recording and registering the serial numbers of tickets and cash-fare receipts collected by the conductor, means for feeding a record-strip, a clock mechanism, printing-wheels driven by said clock mechanism, banks of independently-rotatable station-number-printing wheels, and means whereby said clock-driven printing-wheels and said station-number-printing wheels are caused to make a printing impression; substantially as described.

8. In a conductor's fare-register, the combination with register-printing wheels, station-number-printing wheels, time-printing wheels, and cash-fare-printing wheels, of means for feeding a record-strip, and independently-operable means for making a printing impression from the cash-fare-printing wheels upon said record-strip; substantially as described.

9. In a conductor's fare-register, the combination with a register-printing mechanism, a cash-fare-receipt-printing mechanism, and a time-printing mechanism, of means for supporting a record-strip, and a hat-check strip, one of which is retained in the register, means for issuing the other of said strips from the register, an operating-handle, and means for effecting a printing impression upon said strips from said handle and moving both of said strips together past the printing-wheels; substantially as described.

10. In a conductor's fare-register, the combination with ticket-canceling devices, of a printing register and recorder operating in conjunction therewith, means for effecting a printing impression from said register to make said record coincidently with the cancellation of a ticket, time-printing wheels, and means for feeding a record-strip past said time-printing wheels and said register-printing wheels; substantially as described.

11. In a conductor's fare-register, the combination with ticket-canceling devices, of register-printing wheels, station-number-printing wheels and time-printing wheels, means for feeding a record-strip past said printing-wheels, and means for making a printing impression from said printing-wheels upon said record-strip; substantially as described.

12. In a conductor's fare-register, the combination with ticket-canceling devices, of register-printing wheels, time-printing wheels, and cash-fare-printing wheels, means for feeding a record-strip past said printing-wheels, means for impressing the register and time printing wheels upon said record-strip, and independent means for impressing the cash-fare-printing wheels upon said record-strip; substantially as described.

13. In a conductor's fare-register, the combination with means for recording cash fares, of clock mechanism, means operable independently of the said cash-fare-recording mechanism for impressing the time on the record-strip in connection with each cash-fare item recorded, and printing-wheels for printing the numbers of the stations between which the cash-fare item recorded on said strip is applicable; substantially as described.

14. In a conductor's fare-register, the combination with means for advancing the record-strip, cash-fare-printing wheels for making a record of the cash fare received upon said strip and upon another strip, which other strip is issued from the machine, register-printing wheels, station-number-printing wheels, time-printing wheels, and means for making a printing impression from said last three mentioned printing-wheels upon said record-strip; substantially as described.

15. In a conductor's fare-register, the combination with cash-fare-printing wheels for making a record of cash fares received upon two strips of paper, one of which is issued from the machine and the other of which is retained in the machine to make a permanent record of the transaction, register-printing wheels, station-number-printing wheels, time-printing wheels, means for making a printing impression from said last-mentioned printing-wheels upon said permanent record-strip but not upon the cash-fare receipt issued from the machine, and a spool for supporting a roll of hat-checks, upon which hat-checks the station-numbers and register-number are printed by the said station-number-printing wheels, and the said register-printing wheels; substantially as described.

16. In a conductor's fare-register, the combination with ticket or cash-fare-receipt canceling devices, means for marking said tickets or cash-fare receipts with numbers to identify the order of their cancellation, time-printing wheels, a time-train for driving said printing-wheels, and means for operating said canceling and marking devices coincidently with making a printing impression with said time-printing wheels; substantially as described.

17. In a conductor's fare-register, the combination with ticket or cash-fare-receipt canceling devices, means for marking said tickets or cash-fare receipts with numbers to identify the order of their cancellation, means for recording the time of such cancellation, and means for marking the station-number in connection with the time of cancellation; substantially as described.

18. In a conductor's fare-register, the combination with ticket-canceling devices, of register-printing wheels, means for effecting a printing impression from said wheels upon said ticket and also upon a hat-check, coincidently with the operation of said canceling devices, means for feeding the hat-check from a roll past the register-printing wheels, and means for automatically setting said register-printing wheels after each printing impression; substantially as described.

19. In a conductor's fare-register, the combination with ticket and cash-fare-receipt canceling devices, means for marking said tickets or cash-fare receipts which are canceled with identifying-numbers, means for similarly marking a check to be issued for the ticket or cash-fare receipt canceled, and means for recording the time of issuance of said check; substantially as described.

20. In a conductor's fare-register, the combination with cash-fare-receipt-printing mechanism for printing the amount of a cash-fare receipt on a receipt to be issued and canceled, said printing mechanism also printing said amount on a record retained in the machine, means for canceling said receipt, and means for recording the time of such cancellation; substantially as described.

21. In a conductor's fare-register, the combination with cash-fare-receipt-printing mechanism for printing the amount of a cash-fare receipt on a receipt to be issued and canceled, said printing mechanism also printing said amount on a record retained in the machine, means for canceling said receipt, means for recording the time of such cancellation, and means for recording the station-numbers between which the cash fare is applicable; substantially as described.

22. In a conductor's fare-register, the combination with cash-fare-receipt-printing mechanism for printing the amount of a cash-fare receipt on a receipt to be issued and canceled, said printing mechanism also printing said amount on a record retained in the machine, means for canceling said receipt, means for recording the time of such cancellation, and means for recording the station-numbers between which the cash fare is applicable, said means also printing said station-numbers on a check to be issued for said canceled receipt; substantially as described.

In testimony whereof I hereunto affix my signature, in the presence of two witnesses, this 8th day of April, 1905.

WILLIAM W. KAY.

Witnesses:
F. R. CORNWALL,
GEORGE BAKEWELL.